Feb. 11, 1930.  M. REUTER  1,747,082
NUT OR SCREW CONNECTION WITH DEVICE TO PREVENT LOOSENING
Filed Oct. 24, 1927
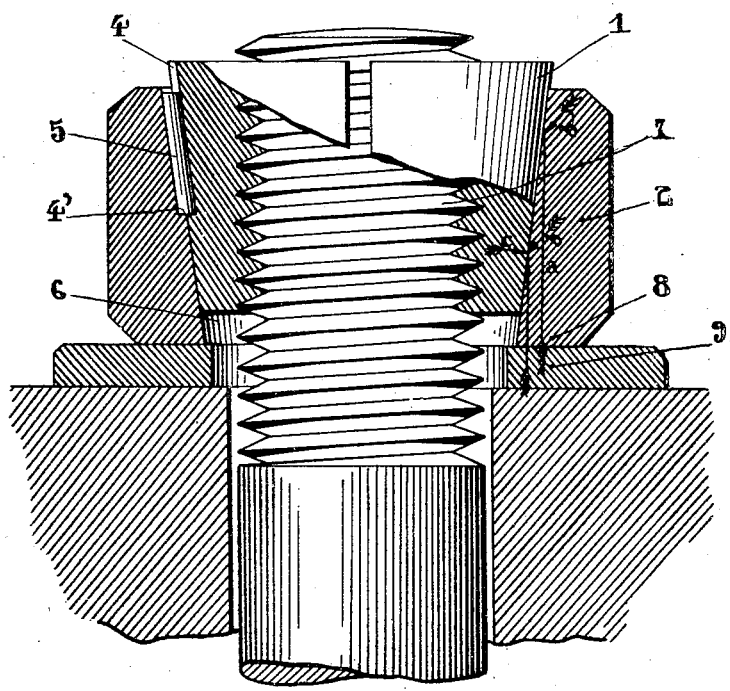
Fig.1
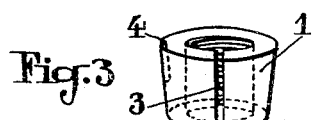
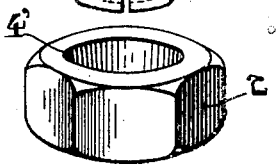
Inventor:
M. Reuter, Patented Feb. 11, 1930

1,747,082

UNITED STATES PATENT OFFICE

MAURICE REUTER, OF PARIS, FRANCE, ASSIGNOR TO FERDINAND MAXIMILIAAN PAUL DE RYCK VAN DER GRACHT, OF BAARN, NETHERLANDS

NUT OR SCREW CONNECTION WITH DEVICE TO PREVENT LOOSENING

Application filed October 24, 1927, Serial No. 228,405, and in France October 27, 1926.

My invention relates to a nut or screw-connection constructed to prevent loosening. In contradistinction to lock nuts in which the means to prevent loosening of the screw connection are positioned outside the nut itself, according to the invention the nut or screw connection is so arranged that, when once it is fixed, loosening from any cause whatever is impossible.

In the adaptation of the invention to nuts, the latter may have the same shape, the same dimensions and the same outer appearance as ordinary nuts. Thus, for example, they may be square, hexagonal, multiple-sided or cylindrical, or be wing nuts or otherwise; furthermore they may have any desired dimensions and be provided with threads of any form or pitch.

The invention, in addition, to nuts can also be adapted to other objects connected to other bodies by means of threads, such as for example fittings for electric lamps, plugs for gas or water supply, connecting pieces for taps and cut-offs, socket-unions and the like.

The nut or screw-connection according to the present invention is primarily characterized by the combination of an outer part, which is provided with a conical bore, with an inner part externally cone-shaped and internally screw-threaded, the inner part being surrounded by the outer part with a slight amount of play.

A further feature is that the inner part is so made that it can execute a resilient movement in the conical space of the outer part, in a radial direction.

To achieve the above purpose the inner part can be provided with one or more slots or saw-cuts running throughout the whole length or with more than one slot or saw-cut, extending over only part of the length. When providing the inner part with more than one slot or saw-cut running throughout the whole length, the loose parts thus formed may be held together by means of an elastic connection, for example a small steel wire fitting in an annular groove.

According to the invention, the inner part is arranged in the outer part in such a manner that it is prevented from rotating, whereas, however, it is slidable in an axial direction in the outer part.

To attain this purpose, the inner and outer parts may be locked against relative rotation by a longitudinal groove, which is formed in the conical surface of each, so that when these grooves register they form together a channel into which a locking pin or wedge or the like can be inserted.

The above described entity-forming parts, i. e. the inner and outer part, are screwed onto a bolt or other body provided with a thread, the end of the outer part that has the smallest bore diameter being turned towards the object against which it is to bear.

When the nut is being screwed on by turning the outer part, it follows that the conical inner part, being secured against rotation relatively to the outer part slides longitudinally continually deeper into the conical bore of the outer part, in which it clamps itself, while at the same time, owing to the resiliency caused by the compression of the limbs of the inner part by the slot or slots, the threads of the inner part engage in the threads of the bolt or the like.

This engagement not only acts on the under surface of the threads, as is the case with ordinary nuts, but also on the upper surface, so that the whole surface of the threads which come into contact with each other are rigidly pressed together.

In the accompanying drawings is shown, solely by way of example, the application of the invention to a nut screw-threaded onto a bolt.

Fig. 1 is a longitudinal section of the nut screwed onto the bolt.

Fig. 2 is an elevation on a smaller scale of a locking pin or the like, which when screwing the nut up, connects the outer or ring portion of the nut with the inner portion so that an axial movement but no radial movement of the two parts relatively to each other, can be effected.

Fig. 3 is a perspective view, on the same scale as Fig. 2, of the longitudinally split inner portion of the nut.

Fig. 4 is a perspective view, also on the same scale, of the outer part which is formed with a conical bore for receiving the inner part.

Fig. 5 is a view of the end of the bolt provided with a thread, for receiving a nut fitted together from the parts shown in Figs. 2, 3 and 4.

As will be seen from the drawing, the nut according to the invention consists of two main parts namely, an inner part 1 and an outer part or ring 2 of hexagonal or other external shape.

The inner part, which is bored and provided on the inside with a thread of the desired form and pitch, has on the outside a slightly conical surface. It is split at 3 over the whole length so that the edges of the slot, when pressure is exerted on the outer surface of the inner part, approach each other, whereby the internal diameter of the bore in the inner part or the nut becomes smaller. On the outer circumference of the inner part 1, at a suitably selected place, a groove 4 is provided, running according to one of the lines describing the cone, which registers with a corresponding groove 4' in the outer part or ring 2, these grooves forming together a channel in which a locking pin or the like 5 fits (Fig. 1, 2 and 7). This locking pin or the like serves to cause the inner part 1 to rotate with the outer part or ring 2; it also permits a certain axial movement of the inner part relatively to the outer part.

The outer part or ring 2, which is provided with a conical bore adapted to receive the inner part 1, has outwardly the shape and size of an ordinary nut and can therefore be hexagonal as shown in the drawing. It may, however, be of any other shape.

The bore of the conical hole in the outer part or ring 2 and the dimensions of the outer conical surface are such that, when the inner part is fitted inside the outer-part, a space 6 is left between the underside of the inner part and the underside of the outer part, thereby permitting during the screwing up of the entire nut, a downwardly directed displacement of the inner part inside the outer part. As already stated, when screwing the entire nut onto the bolt, the two parts form practically one entity, as they are connected together by means of the pin or the like 5, which, however, permits a relative displacement of the parts 1 and 2 in the longitudinal direction.

The tightening of the safety nut can be effected in the ordinary way by means of a spanner fitted onto the outer part or ring, whereby the nut is screwed onto the threaded part 7 of the bolt.

Owing to the fact that both parts are coupled together by the pin 5, the nut can be turned without undue exertion onto the bolt, until the under or inner surface 8 of the ring contacts with the outer or upper surface 9 of the washer or other object to be fastened (Fig. 1). From this moment the safety action of the nut begins, as the outer part or ring 2 cannot move downwardly any further over the bolt 7, but, owing to the fact that both parts turn as one whole, the inner part 1 grips further into the thread, whilst it is moved longitudinally in a downward direction.

Owing to this movement the inner part becomes clamped continually tighter in the ring, whereby, owing to the split 3 becoming smaller, its diameter continually becomes smaller and the nut becomes clamped increasingly tighter onto the whole surface of the threads with which it is in contact.

After the nut has been secured in the manner described above, it can only be loosened by imparting a rotating movement in the opposite direction to the ring 2, it being understood that after the pin 5 has been fitted into the grooves 4, it is permitted to remain permanently in place.

As is known, in the case of ordinary nuts jerking or vibration of objects or parts fastened together by means of threads is sufficient to bring about the loosening of the nut. Any vibration or shock which the nut experiences from the bottom upwards has the tendency to force it back over the sloping screwing surface formed by the inner surface of the thread. This tendency can only be counteracted by the adhesion of the under surface of the nut to the upper surface of the object or part which is being held fast. In the long run, however, this adhesion is not sufficient to prevent the nut from further working loose.

Owing to the expansion of the bolt, either caused by the nature of the material or by the influence of the temperature; by wearing of the surfaces of the threads caused by the continuous jerking or vibration, resulting in a relative displacement of these surfaces, a slight amount of play will arise between the undersurface of the washer and the upper-surface of the object on which it rests, so that there is no more adhesion between these surfaces.

As soon as this is the case, nothing prevents the rotation of the nut under the influence of jerking and vibration and it is free to come loose further and further.

The above described objections are removed by adapting the nut or screw-connection according to the invention, in that all upwardly directed shocks caused by vibration result in vertical forces, which are shown in Fig. 1 by the arrow $a$. These forces, which act on the surfaces on which the outer part or ring and the inner part are in register, are divisible into two series of other forces, also shown by arrows, of which the forces $b$ might force the inner part upwardly over the sloping surface of the threads, if the other forces c, which act radially on the bore, did not increase the security of the nut throughout the whole surface of the threads and as a result did not counteract any rotary movement.

It should be remarked here that the yielding of one of the screw thread flanks need never be feared, because the effect of shocks or vibrations is merely that the nut is blocked on the thread and over the whole surface thereof.

Furthermore, it should also be stated that to ensure the inner part turning with the outer part there may be means other than the locking pin; the same purpose can for example, be achieved by making the conical centre part many-sided or by providing one or more projections which engage in longitudinal grooves of the outer part, or vice versa.

The degree of conicity of the bore in the outer part and of the surface of the inner part may be determined in any suitable manner with respect to the purpose in view.

As previously stated, the nut described and illustrated forms merely one embodiment of the invention. Within the limits of the invention various other embodiments are possible, whilst the sphere of adaptation of the invention extends to all screw-connections to which it applies.

What I claim is:—

1. A lock nut adapted for use with bolts or the like, comprising a longitudinally slitted, externally conical and internally screw-threaded inner core member and an internally conical outer ring member, characterized by the fact that the core member is permanently connected to the ring member by a single separate pin or like connecting member at a point, by which the core member is divided into two unequal portions, the smallest of which is situated behind the slit viewed in the unscrewing direction of the nut, whereby the larger portion of the core member has a braking tendency against the threads of the bolt to resist rotation relatively thereto.

2. A lock nut adapted for use with bolts or the like and comprising two concentric members, the inner core member being longitudinally split and having an external conical surface and being internally screw-threaded, the outer ring member having an internal conical surface corresponding to that of the core member, and but a single pin for connecting the two concentric members, the pin member lying in longitudinal grooves formed in the outer surface of the core member and in the inner surface of the ring member, the grooves extending substantially half the longitudinal distance of the two members and situated at a point in the circumference thereof at which the core member is divided into two unequal portions, the smaller portion of which is situated behind the slit when viewed in the unscrewing direction of the nut, whereby the larger portion of the core member has a braking tendency against the threads of the bolt to resist rotation relatively thereto.

3. A lock nut comprising a longitudinally slitted externally conical and internally screw-threaded core member, and internally conical outer ring member surrounding and fitting the core member, the core member, when in its normal expanded condition fitting within the ring member with its lower end spaced inwardly from the lower end of the ring member, the core and ring members each having therein but a single groove, the said grooves registering with each other and being located nearer the slit in the core member in one direction of the circumference than in the other, thus dividing the ring into two portions of unequal size, the said slit defining the forward boundary of the said smaller portion when viewed in the direction of unscrewing of the nut, and a pin permanently fitted into the said grooves and constituting means for connecting the core member for rotation with the ring member when threading the nut onto a bolt and permitting the wedging longitudinal movement of the core member into the ring member when the lower side of the ring member is in engagement with the part to be secured and is therefore, in itself, not capable of further movement in the direction of the length of the bolt, to thereby effect a clamping of the core member about the bolt, the said pin further constituting means, permanently in place, for connecting the said core and ring members whereby, in the event of attempted unthreading rotation of the ring member, the threads of the core member will have wedging engagement with threads of the bolt to resist such movement of the ring member.

In testimony whereof I affix my signature.

MAURICE REUTER.